US012320712B2

(12) United States Patent
LeBlanc et al.

(10) Patent No.: US 12,320,712 B2
(45) Date of Patent: Jun. 3, 2025

(54) COIL OF REFERENCE FIBER FOR DOWNHOLE FIBER SENSING MEASUREMENT

(71) Applicant: Halliburton Energy Services, Inc., Houston, TX (US)

(72) Inventors: Michel LeBlanc, Houston, TX (US); Mikko K. Jaaskelainen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 631 days.

(21) Appl. No.: 17/547,867

(22) Filed: Dec. 10, 2021

(65) Prior Publication Data

US 2023/0184597 A1    Jun. 15, 2023

(51) Int. Cl.
*G01K 11/324* (2021.01)
*E21B 47/06* (2012.01)
*G01K 11/3206* (2021.01)
*G01K 11/322* (2021.01)
*G01L 1/24* (2006.01)

(52) U.S. Cl.
CPC ............ *G01K 11/324* (2021.01); *E21B 47/06* (2013.01); *G01L 1/246* (2013.01); *G01K 11/3206* (2013.01); *G01K 11/322* (2021.01)

(58) Field of Classification Search
CPC .. G01K 11/322; G01K 11/3206; G01L 1/246; E21B 47/07
See application file for complete search history.

(56) References Cited

U.S. PATENT DOCUMENTS

| | | | |
|---|---|---|---|
| 2004/0113104 A1* | 6/2004 | Maida, Jr. | H04B 10/2589 250/573 |
| 2006/0115204 A1 | 6/2006 | Marsh et al. | |
| 2013/0100984 A1 | 4/2013 | Agawa | |
| 2014/0285793 A1* | 9/2014 | Jaaskelainen | G01L 1/242 356/32 |
| 2017/0009571 A1* | 1/2017 | Bhongale | G01B 9/02 |
| 2020/0370928 A1* | 11/2020 | Ip | G01K 11/322 |
| 2021/0156734 A1 | 5/2021 | Johnston et al. | |
| 2021/0270667 A1* | 9/2021 | Ellmauthaler | H04B 10/071 |
| 2021/0388716 A1* | 12/2021 | Cerrahoglu | E21B 47/107 |

(Continued)

FOREIGN PATENT DOCUMENTS

CN    109029769 A    12/2018
CN    110174242 A    8/2019
WO    WO-2017196317 A1 *  11/2017    ......... E21B 47/0006

OTHER PUBLICATIONS

Translation of CN109029769A (2018).*

(Continued)

*Primary Examiner* — Mirellys Jagan
(74) *Attorney, Agent, or Firm* — Kilpatrick Townsend & Stockton LLP (57) ABSTRACT

A system may include a sensing fiber that can receive interrogation data via a coil of reference fiber, the coil of reference fiber configurable to be of a same type of fiber as the sensing fiber, and the sensing fiber configurable to be coupled in series with the coil of reference fiber. A known temperature and a known strain can be received from the coil of reference fiber. The known temperature, the known strain, and the interrogation data can be outputted for calibrating a measurement of the interrogation data.

14 Claims, 4 Drawing Sheets

(56) References Cited

U.S. PATENT DOCUMENTS

2022/0011464 A1\* 1/2022 Alali ................ G01K 11/32
2022/0186612 A1\* 6/2022 Maida, Jr. ............ E21B 47/135

OTHER PUBLICATIONS

Unpublished U.S. Appl. No. 63/124,960, filed Dec. 14, 2020.
Halliburton, "Fiber Optic Sensing of Subsea Wells", 2021, 15 pages.
International Search Report and Written Opinion, PCT/US2021/062860, Aug. 31, 2022, 11 pages.

\* cited by examiner

COIL OF REFERENCE FIBER FOR DOWNHOLE FIBER SENSING MEASUREMENT

TECHNICAL FIELD

The present disclosure relates generally to wellbore operations and, more particularly (although not necessarily exclusively), to performing fiber sensing measurements in a subsea wellbore.

BACKGROUND

Distributed fiber optic sensing, such as distributed temperature sensing (DTS), distributed acoustic sensing (DAS), and distributed Brillouin-frequency sensing (DBFS), along with a fiber optic system may be used to determine borehole properties or formation properties. Distributed fiber optic sensing can be a cost-effective method of obtaining real-time, high-resolution, highly accurate temperature or strain (static or dynamic, including acoustic) data along a wellbore. In some examples, discrete sensors (e.g., for sensing pressure, temperature, or strain), may be deployed in conjunction with a fiber optic cable. Distributed fiber optic sensing can be enabled by continuously sensing along the length of the fiber, and effectively assigning discrete measurements to a position along the length of the fiber. Optical time-domain reflectometry (OTDR) or optical frequency-domain reflectometry (OFDR) distributed fiber optic sensing can also be used to conduct measurements.

Subsea operations may present challenges in optical fiber sensing, which may relate to the quality of the overall signal in distributed fiber optic sensing systems with a longer fiber optic transmission and sensing cables. The overall signal may be useful since the end of the fiber may be positioned at the interval of interest (i.e., the well and reservoir sections of interest). Measurements of the Brillouin frequency along sensing fiber regions can be interpreted in terms of strain, temperature, or pressure using Brillouin optical time domain reflectometry (BOTDR) by itself or in conjunction with DAS or Raman-based DTS systems. Optical attenuation across connectors and splice may, in some instances, have a wavelength dependence that varies with environmental temperature or directionality of propagation of optical signals. Any wavelength dependent attenuation as the signals pass through connectors, splices, and optical feedthrough systems (OFS) may generate step changes in the measured temperature profile. Calibration may be used to mitigate some of these effects, but components or connections can change characteristics over time, and a system may need to periodically be re-calibrated or re-baselined with associated changes in the temperature profile and data interpretation to achieve accurate and stable temperature measurements required for subsea well and reservoir diagnostics. Re-calibration can complicate data interpretation and modeling with associated data interpretation inaccuracies over time as the data drifts due to changing attenuation characteristics.

DETAILED DESCRIPTION

Certain aspects and features relate to a coil of reference fiber providing a known temperature and a known strain for interpreting interrogation data received via the coil of reference fiber from a downhole sensing fiber. The coil of reference fiber can be a coil made from the same type of fiber as the sensing fiber, or substantially similar to the downhole fiber. The coil of reference fiber can be used to provide a remote reference measurement, such as the known temperature and the known strain. The remote reference measurement may be used to interpret the accuracy of the interrogation data. Further, the coil of reference fiber can be used for generating calibration data that may be used for interpreting the interrogation data. The calibration data can be additional temperature data that is generated from a particular configuration of the coil of reference fiber. For example, the calibration data can be used for understanding and dealing with offsets in the interrogation data. The configuration of the coil of reference fiber can differ according to different examples of the present disclosure. Interrogation data may be used to obtain temperature and strain measurements taken from within the wellbore and may be analyzed based on calibration data to produce calibrated measurements that can be used to determine or control wellbore operations.

A system according to some examples can measure and differentiate between temperature and strain along a sensing fiber, past a distal circulator, using Brillouin sensing while providing point or distributed gain, enabling extended range sensing including situations involving various step or distributed changes in the signal amplitude along the fiber. The gain and attenuation may distort the Brillouin peak amplitude, but the coil of reference fiber, which may have a known temperature and be strain free or include a known strain, can enable real-time calibration for each data collection.

Temperature measurements at extended distances may be challenging. For example, distributed temperature sensing (DTS) can be performed using Raman backscattering, but traditional Raman DTS may not perform adequately in view of the deployment conditions. Two issues affecting performance can include the available optical power budget and the wavelength dependency of the measured back scattered signals to calculate accurate temperature profiles.

Raman-based systems may be limited in optical power due to the physics of Raman scattering. Raman-based systems may also suffer significantly in subsea applications due to the optical attenuation of the multiple wet-mate and dry-mate optical connectors, splices, optical feedthrough systems, and downhole fibers.

Wavelength dependency of measured Stokes and anti-Stokes intensities as the temperature profile can be calculated as a function of the ratios of these signals, can be an issue. A Raman DTS system operating at 1550 nm may use at least approximately 100 nm of bandwidth around the center wavelength to collect the back-scattered Stokes and anti-Stokes signals to calculate the temperature. The optical attenuation across connectors, splices, and fibers may have a wavelength dependence that varies with environmental temperature, directionality of the propagation of the optical signals, or micro bend loss or macro bend loss or chemical changes, such as hydrogen-induced attenuation. Wavelength-dependent attenuation, as the signals pass through connectors, splices, fibers, and optical feedthrough systems, may generate inaccuracies in the measured temperature profile. Periodic calibration may be used to mitigate some of these effects, but components and connections can change characteristics over time, resulting in associated changes in the temperature profile, temperature data accuracy, and data interpretation. The periodic calibration may require manual adjustment and tuning where the frequency of calibration may depend on a number of external factors depending on the cause of the attenuation. Modeling and data interpretation may therefore need to be manually adjusted as discontinuities and errors in the data may cause unrealistic or inaccurate results.

Subsea interrogator development for subsea sensing, calibration or otherwise can be time consuming and expensive. Deploying subsea interrogators may involve remotely operated vehicles or dedicated deployment vessels, and electrical infrastructure for power and data communication. Subsea interrogators may be limited in practical applications due to cost and overall system complexity.

Brillouin-based optical sensing can involve a Brillouin-based interrogator measuring a wavelength (or frequency) shift of the Stokes/anti-Stokes components that is proportional to strain and temperature. This type of interrogators can be available with large optical dynamic ranges, can be insensitive to wavelength-dependent attenuation changes. One issue, however, may be that the response is sensitive to both temperature and strain. One way to address the cross-sensitivity to strain and temperature is to have one fiber exposed to strain and temperature with a second fiber exposed to temperature in a strain free environment. This, however, involves multiple fibers and it can be difficult to ensure a strain free fiber deployment across a large temperature range or cable deployments commonly used in energy applications.

In some examples, however, a temperature response coupled to back-scattered Brillouin intensity, and in combination with the Brillouin wavelength shift, can be used to differentiate between temperature and strain. Temperature can be accurately measured with Brillouin technology at extended reach distances, even in view of the cross sensitivity between temperature and strain. A Brillouin-based system according to some examples can be calibrated using a calibration module between the distal circulator and sensing fiber to enable temperature and strain separation through accurate calibrated measurements of the Brillouin peak intensity.

Each fiber installed within a wellbore may have a Brillouin frequency that depends on the characteristics of the fiber and the temperature and the strain present within the wellbore. Measurements of temperature and strain via the fiber can be position-dependent, and calibration data can be collected prior to installing the optical sensing fiber. But, long-term effects on an interrogator device or the fiber as well as cable installation, may result in shifts of the measurements and deviate from a previously calibrated cable, which may cause an application of the calibration data to be questionable with respect to the downhole fiber. Even in the case where the measurements may be stable, confirming the measurements of the downhole optical fiber with known measurement locations within the wellbore may be useful. In some examples where different fiber types may be used, a Brillouin interrogation system can be sensitive to fiber-type changes within the wellbore, and this may result in a dead zone or areas where measurements may be inaccurate at the location where the fiber type changes as fiber back scatter characteristics (amplitude, Brillouin peak frequency etc.) may change. The dead zone may be minimal or it may be anywhere from 10 m to 20 m (or approximately 32.8 ft. to 65.6 ft.) in length, as an example. The Brillouin system may be calibrated to each fiber type. Other examples of dead-zones may be points with excessive reflections or changes in back scatter coefficients at the relevant wavelengths of the optical fibers and examples of this include locations like fiber splices or connectors at a wellhead or at connection points along the sensing fiber. These points may result in erroneous measurements being taken due to inaccurate signal levels around the dead zone. Some of these points may also have higher attenuation and a process to overcome some of the impact of the attenuation may include a method that uses a specific type of fiber, such as an enhanced backscatter fiber, may be able to obtain stronger signals to overcome optical fiber attenuation, but this method may be expensive.

Some examples of the present disclosure include a coil of reference fiber, provided at a suitable location (e.g., at or around a subsea tree), that can provide the known temperature or the known strain for confirming temperature or strain measurements from the downhole fiber. In some examples, one or more coils of reference fiber may improve the accuracy and tracking of measurements taken for multiple wells while using the same interrogator device and an optical switch between wells. The known temperature or strain from the coil of reference fiber can be used to calibrate the response of the sensing signals from the downhole fiber.

For example, a downward, travelling pulse amplitude may be amplified, and then reach the calibration module with a desired signal strength level. The signal can pass through the calibration module and any back-scattered light containing Brillouin shift wavelength information and intensity may be amplified on the return leg where the gain of the Brillouin peak intensity may create an offset in the calculated temperature. The offset can be removed or calibrated out if the temperature and strain of the calibration module is known, thus enabling accurate temperature and strain measurements in the sensing fiber beyond the calibration module. Optical pulses from the Brillouin system can pass through a calibration module housing an un-strained fiber, or multiple unstrained fibers, with a known strain as a function of temperature, or fiber(s) coupled to one or more materials with a known temperature and properties, to enable an accurate calculation of the strain and temperature.

In some examples, calibration can involve using a single cylinder wrapped with an optical fiber to form a calibration module with characteristics obtained prior to deployment. Temperature can be measured, for example, using a fiber Bragg grating temperature sensor. A fiber-wrapped cylinder can be calibrated so that the measured Brillouin wavelength shift can be the sum of temperature and strain, where the thermal coefficient of expansion for the cylinder is known, enabling differentiation between temperature and strain. In other examples, a coil of unstrained fiber can be used such that the measured Brillouin shift may be due to temperature, and an additional temperature measurement may be performed for calibration purposes.

In other examples, the calibration module can include two cylinders wrapped with the same optical fiber. The cylinders can be made of different materials with different thermal coefficient of expansion. This can enable an accurate temperature calculation of the calibration module by knowing the optical strain response of two different fiber wrapped cylinders and by measuring the Brillouin peak shift of the fiber wrapped on the cylinders where the difference in peak wavelength can be a function of temperature. The measured intensity can be proportional to temperature. This information can then be used to calibrate the Brillouin intensity and the measured Brillouin data beyond the circulator. In another example, signal gain in the system can be actively measured using probe lasers upstream in a signal strength-monitoring module for calibration. Signal gain can be measured and the signal gain can be used for Brillouin intensity temperature calibration, optionally calibrated with one or more temperature sensors.

In other examples, calibration can be performed, with or without a calibration module, using the downhole temperature from one or more pressure/temperature sensors in the wellbore. At least one known temperature can be associated with the Brillouin intensity at a specific downhole location. In other examples, calibration can use a predicted or modelled temperature in the system for Brillouin intensity thermal calibration, with or without a calibration module. For example, surface measured fluid temperatures in flow lines where heat losses in the flow lines can be estimated or modelled in order to determine a subsea or suitably stable well bore temperature (i.e. in areas without reservoir inflow, gas lift etc.) such that the temperature can be used for calibration purposes. Many of the alternative calibration methods may be inaccurate or impractical when compared with a calibration module.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
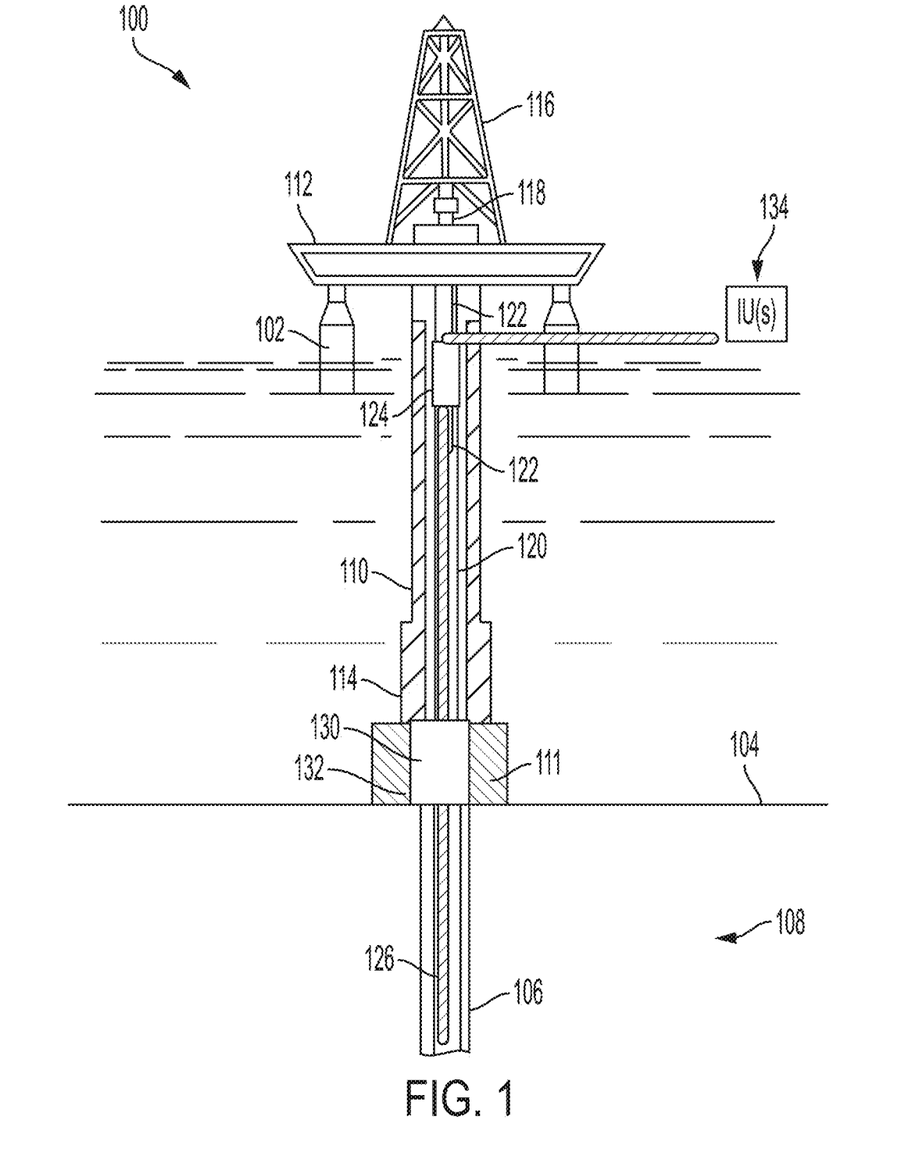
FIG. 1 is a schematic diagram of a sensing fiber positioned downhole in a subsea wellbore according to one example of the present disclosure.

FIG. 1 depicts a schematic diagram 100 of a sensing fiber 126 that is positioned downhole in a wellbore 106. A floating workstation 102 (e.g., an oil platform or an offshore platform) can be centered over a submerged oil or gas well located in a sea floor 104 having a wellbore 106. The wellbore 106 may extend from the sea floor 104 through a subterranean formation 108. A subsea conduit 110 can extend from a deck 112 of the floating workstation 102 into a wellhead installation 114 and a subsea tree 111. The subsea tree 111 can be positioned at the sea floor 104. The floating workstation 102 can have a derrick 116 and a hoisting apparatus 118 for raising and lowering tools to drill, test, and complete the oil or gas well. The hoisting apparatus 118 may include a tubing hangar (not pictured). In some examples, the processes described herein can be applied to a land-based environment for wellbore exploration, planning, and drilling. A tubing string 120 can be lowered into the wellbore 106 of the oil or gas well as part of a completion operation of the oil or gas well. A sensing fiber 126 may be ran in a downhole direction from the tubing hangar of the hoisting apparatus 118, and may be extended through a splice housing protector 124. Sensing fiber 126 may be a single mode fiber or an enhanced backscatter fiber with properties to provide increased signal to noise properties for a DAS system. Enhanced backscatter fibers may be designed to provide an enhanced backscatter response within a wavelength range tailored to interrogator unit(s) (IU(s)) 134 where a Brillouin wavelength may not fall within the enhanced backscatter wavelength range. The IU(s) 134 may include one or more of a distributed acoustic sensing interrogator unit (DAS IU) or a distributed Brillouin-based IU. And, the IU(s) 134 may be opto-electrically coupled to the sensing fiber 126 at a surface (e.g., floating workstation 102) of the wellbore 106 for receiving signals that pass through the sensing fiber 126. The IU(s) 134 may receive signals from the sensing fiber 126 via a coil of reference fiber 130 that may be coupled to the sensing fiber 126. Similarly, any other type of fiber optic interrogator may be multiplexed into the sensing fiber using a wavelength division multiplexer (WDM), where other fiber optic interrogators may operate using other sensing principles ranging from Raman scattering, Fiber Bragg Grating (FBG) sensing, intensity detection based, wavelength detection based, interferometric sensing systems or other systems. Fiber optic point pressure sensors or temperature sensors may also be included along sensing fiber 126.

In some examples, the coil of reference fiber 130 may be positioned at a location by the wellbore 106 for providing a reference measurement of temperature or strain where there may be a weak signal emitted by the sensing fiber 126. For example, the coil of reference fiber 130 may be positioned at the subsea tree 111, which may allow the coil of reference fiber to provide the known temperature near the wellhead 114 where the signal emitted from the sensing fiber 126 may be weak. The coil of reference fiber 130 can be spliced with a portion of the sensing fiber 126 at the subsea tree 111 to provide a known strain and a known temperature. The coil of reference fiber 130 may be positioned within an inner area defined by a housing 132 (e.g., a metal container) that is placed on the subsea tree 111 or the tubing hangar of the hoisting apparatus 118. In one example, the housing 132 can be positioned at a location with stable temperature for allowing the coil of reference fiber 130 to provide the known temperature and the known strain and to generate additional calibration data. The housing 132 may filled with a thermally conductive or thermally non-conductive material. While the coil of reference fiber 130 may be described above with respect to the subsea tree 111, the coil of reference fiber 130 may be positioned at any other location for providing the reference measurement of temperature or strain for downhole fiber sensing. For example, the coil of reference fiber 130 may be positioned at any other location within the wellbore 106. Alternatively, the coil of reference fiber 130 may be positioned external to the wellbore 106, such as at the surface of the wellbore 106 or near the wellbore 106.

A splice housing protector 124 may be positioned around the tubing string 120, uphole of the coil of reference fiber 130. In some examples, an operator of the wellbore 106 may perform a fusion splice of the sensing fiber 126 and the coil of reference fiber 130. An optical integrity test may be used to determine if the sensing fiber 126 and the coil of reference fiber 130 have optical integrity with one another. If there is optical integrity, a successful splice creates a combined fiber. The splice may be sealed and the combined fiber optic cable 122 may be positioned within the wellbore 106. Additionally or alternatively, the coil of reference fiber 130 can be coupled in series with the sensing fiber 126 and may then be positioned within the wellbore 106.

Figure 2:
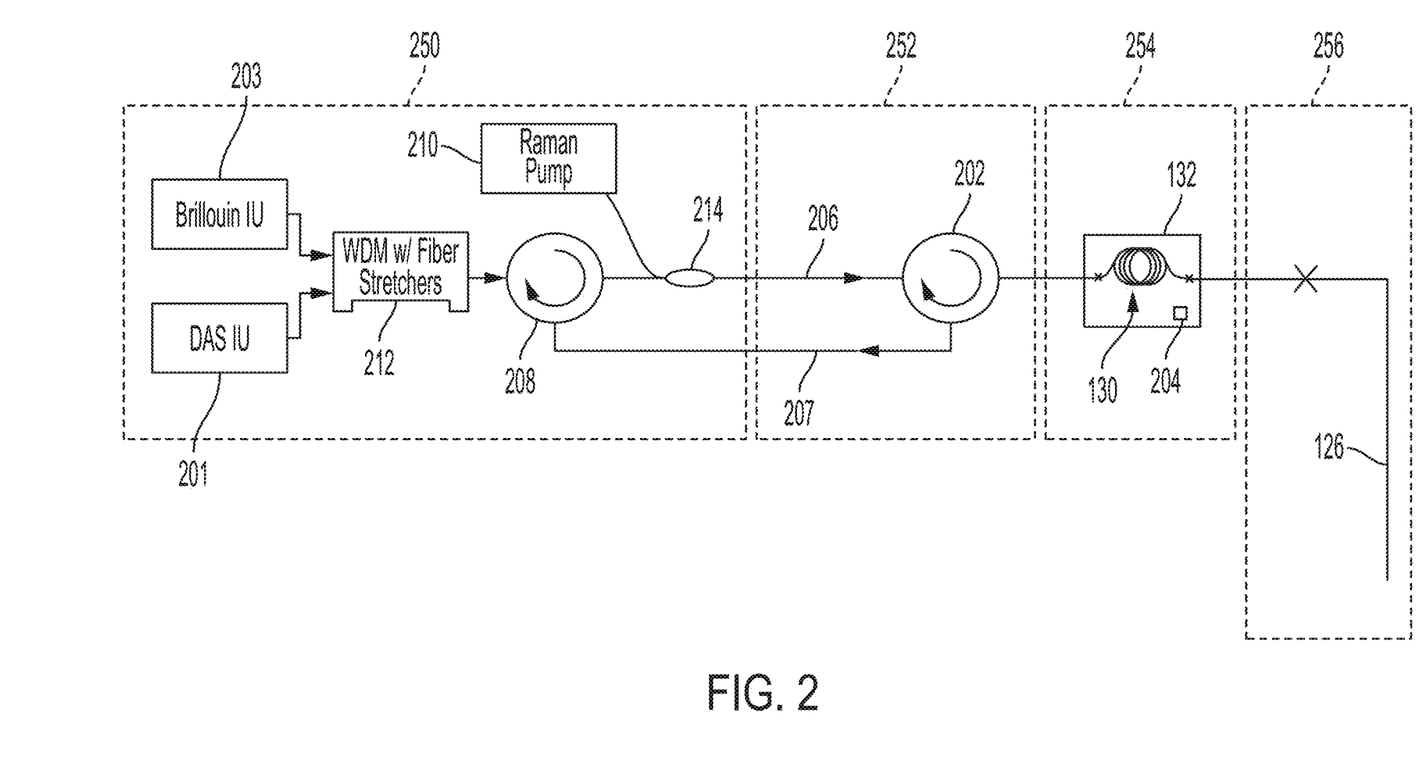
FIG. 2 is a schematic block diagram of an example of a subsea installation architecture including a coil of reference fiber coupled to a downhole sensing fiber according to one example of the present disclosure.

FIG. 2 is a schematic block diagram of an example of a subsea installation architecture including a coil of reference fiber coupled to a sensing fiber 126 according to one example of the present disclosure. The blocks in FIG. 2 can be positioned in a topside portion 250, an umbilical portion 252, a subsea tree portion 254, and a downhole portion 256, by way of example. A DAS system may include one or more IU(s) 134, umbilical fiber 206, and the sensing fiber 126. Shown in FIG. 2 for IU(s) 134 are a DAS IU 201 and a Brillouin-based IU 203. But, in other implementations, one type of IU may be used or other types than those shown may be used. A Brillouin-based IU 203 may be used, for example, for temperature and static strain. A DAS IU 201 may be used, for example, with Rayleigh scattering to measure dynamic strain. For example, the DAS IU 201 can measure and record the dynamic strain along the sensing fiber 126. The DAS IU 201 an each emit coherent light pulses at a distinct optical wavelength.

The IU(s) 134 may couple to the umbilical fiber 206 through other components, such as a wavelength division multiplexer (WDM) with fiber stretchers 212, a Raman pump amplifier 210, a topside circulator 208, and pump WDM 214. Fiber stretchers 212 may house multiple components, such as WDMs and optional inline fiber stretchers where optical fiber is wrapped around a piezo electric cylinder that can be electrically modulated in order to imprint strain signatures on the optical fiber. In some examples, the pump WDM 214 may be a fused fiber WDM or micro-optic WDM or a coupler. Raman pump amplifier 210 can be optically coupled to the pump WDM 214 and the WDM with fiber stretchers 212 through the topside circulator 208. In some examples, the topside circulator 208 can be spliced to the umbilical fiber 206. The WDM with fiber stretchers 212 may be in line with the umbilical fiber 206 and located before the topside circulator 208 that is spliced with the umbilical fiber 206. Raman pump amplifier 210 can be spliced with the sensing fiber 126 for selectively amplifying backscattered light originating from the sensing fiber 126 and for providing gain of the interrogation data. Even though a single Raman pump 210 is shown, in other examples multiple Raman pumps may be used for amplifying signals in one or more umbilical fibers 206, 207 for various co-pumped and counter-pumped Raman amplification schemes.

The gain in amplifying the optical signals used for temperature and strain sensing and differentiating the IU(s) 134 may result in measurements of the interrogation data that can be calibrated using known characteristics from a coil of reference fiber 130. The WDM with fiber stretchers 212 and pump WDM 214 can filter out excess optical power to reduce the risk of thermal damage to the IU(s) 134. The WDM with fiber stretchers 212 may include a demultiplexer assembly that can separate multi-wavelength backscattered light into individual wavelength (frequency) components and can redirect each single wavelength backscattered light stream back to the corresponding IU 134. In an example, WDM with fiber stretchers 212 may use an optical add-drop multiplexer to enable multiplexing the light received from one or more of the IU(s) 134 and a Raman pump amplifier 210. In some examples, Raman light from 210 can traverse the fiber towards sensing fiber 126 and not towards the WDM 212. WDM with fiber stretchers 212 may also include circuitry to amplify the multi-frequency light optically and prior to launching the optical signal into the optical fiber. WDM with fiber stretchers 212 may also or alternatively include optical circuitry to amplify optically the multi-frequency backscattered light returning from the sensing fiber, thereby compensating for optical losses introduced during optical (de-)multiplexing.

The umbilical fiber 206 may couple to the sensing fiber 126 and a subsea circulator 202. In some examples of the present disclosure, the subsea circulator 202 may be a circulator spliced with the umbilical fiber 206 to steer light unidirectionally between one or more inputs and one or more outputs of the circulator 202, such as umbilical fiber 206 and an upstream umbilical fiber 207. Further, both circulators 202, 208 can aid in allowing similar pulse repetition rates that may be present in scenarios where surface processing equipment is positioned in proximity of the wellhead 114.

The coil of reference fiber 130 can be positioned at the subsea tree portion 254, between the subsea circulator 202 and the sensing fiber 126. The position of the coil of reference fiber 130 may allow accurate temperature and strain separation of Brillouin frequency from the DAS system. The coil of reference fiber 130 can be of sufficient length (e.g., 20 m (approximately 65 ft.), or between 50 m and 100 m (between approximately 160 ft. and 330 ft.) to dissipate an effect of a change in fiber type (e.g., a dead zone) in a Brillouin frequency measurement and allow a Brillouin frequency to be determined. The coil of reference fiber 130 may be loose for allowing an elastic axial strain of the coil of reference fiber 130 to be zero. The coil of reference fiber 130 can be of the same type of fiber as the sensing fiber 126. In some examples, the coil of reference fiber 130 may be installed once the sensing fiber 126 is cut, and the coil of reference fiber 130 may be taken from a remnant of the sensing fiber 126 to form the coil of reference fiber 130. In some examples, multiple coils can be used, and each coil can include a different known strain for use in multiple wells. In some examples, where tracking multiple wells, the subsea installation architecture may follow the examples described above and may include one or more optical switches between wells.

The coil of reference fiber 130 can be within a housing 132, which is positioned at the subsea tree portion 254. The housing 132 may have a first port for optically coupling to the sensing fiber 126 and a second port for optically coupling to the umbilical fiber 206. In some examples, the housing 132 may be a sealed container that has a high thermal mass and a high thermal conductivity for providing uniformity of a temperature of the coil of reference fiber 130 while sustaining subsea hydrostatic pressure. In an example, the housing 132 may be a metal container of a metal with known properties. Known properties may include a thermal coefficient of expansion usable for determining the temperature of the metal and generating calibration data. The metal container may be in thermal contact with the coil of reference fiber 130 or it may be thermally isolated using a suitable acoustically and or thermally insulating material. A reference coil packaged in housing 132 using a suitable acoustic insulation material may be used as a calibration reference for the DAS system, and may be used to determine the health of the DAS system over time. Increased levels of acoustic noise in the acoustically isolated reference coil may be used to identify and quantify DAS system performance, and the measured data can be used to automatically notify a supervisory system or user if the measured data exceeds defined threshold values, such as system noise floor or laser signal strength, for example. DAS noise floor measurements in the reference coil inside housing 132 may also be used to influence Raman amplification gain set-points in one or more fibers 206, 207 to optimize system level signal to noise ratios and sensing system performance. In an example, the coil of reference fiber 130 may be wrapped within the metal container to be in contact with the coil of reference fiber 130. In some examples, the design of the housing 132 can vary, and a particularly useful architecture can provide for thermal insulation between an inner housing that can contain the coil of reference fiber 130 and an outer housing that can be in contact with the surrounding environment (e.g., preferably ocean water). There may be multiple materials used for the housing 132 with different coils for the coil of reference fiber 130 for generating calibration data for use in interpreting interrogation data in multiple wells. Examples of the multiple coil materials may include different kinds of metals (e.g., aluminum, iron, copper) that have different thermal coefficients of expansion.

One or more temperature sensors 204 can be installed inside the housing 132 to measure the temperature of the coil of reference fiber 130 for generating calibration data. The temperature sensor 204 can be an electrical sensor communicatively coupled to a subsea tree monitoring system (not pictured) at the surface, or it may be a fiber optic sensor based on e.g. Fiber Bragg Grating (FBG) technology, where the FBG sensor may be in line with the reference coil fiber and use umbilical fibers 206, 207 to communicate with a FBG IU 134. The data may be provided to the surface by telemetry using the umbilical connection between the subsea tree and a production platform (e.g., floating workstation 102). The data can be used for calibrating interrogation data received via the sensing fiber 126.

Although depicted using a single Raman pump amplifier 210, the system shown in FIG. 2 can have other configurations. For example, two or more Raman pump amplifiers can be used, along with two or more WDMs and two or more fiber Bragg grating sensors for obtaining multiple measurements from multiple signals received through the coil of reference fiber 130 from the sensing fiber 126.

Figure 3:
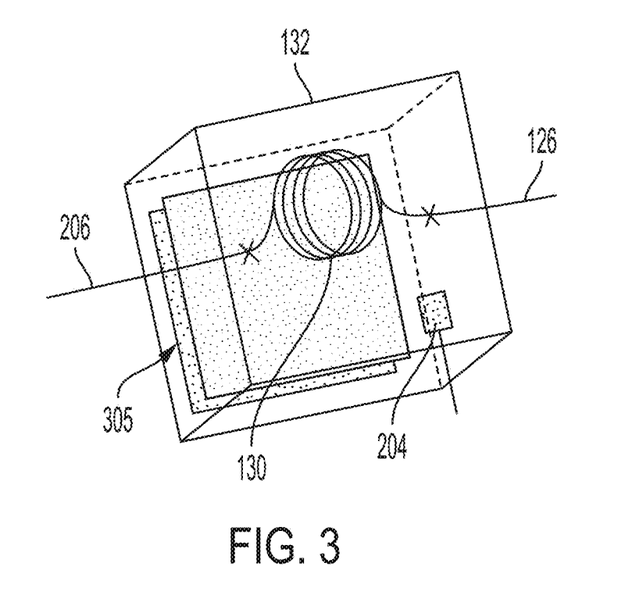
FIG. 3 is a schematic diagram of an example of a housing including a coil of reference fiber according to one example of the present disclosure.

FIG. 3 is a schematic diagram of an example of a housing 132 including a coil of reference fiber 130 according to one example of the present disclosure. The housing 132 can be optically coupled between the sensing fiber 126 and umbilical fiber 206. In some examples, a heater 305 can be provided inside the housing 132 to control the temperature of the coil of reference fiber 130, which can be used to generate calibration data. The heater 305 may provide for remote calibration of the coil of reference fiber 130 and the sensing fiber 126. In some examples, temperature sensor 204 within the housing 132 may be used to measure the temperature of the coil of reference fiber 130. For example, the temperature of the coil of reference fiber 130 may be measured before and after a temperature increase by the heater 305. The known temperature increase may be detected in a temperature profile of the Brillouin device. In an example, a remote temperature increase of the heater 305 may increase the temperature of the coil of reference fiber 130 by a known amount. Additional components, such as an acoustic transmitter, may be located in housing 132 where a periodic transmission may be used for depth (fiber length) calibration along the fiber for a DAS system. The acoustic transmitter may be battery powered to allow calibration during the installation of the system. Temperature sensor 204 may be communicatively coupled to the acoustic transmitter to acoustically emit a signal proportional to the measured temperature.

Figure 4:
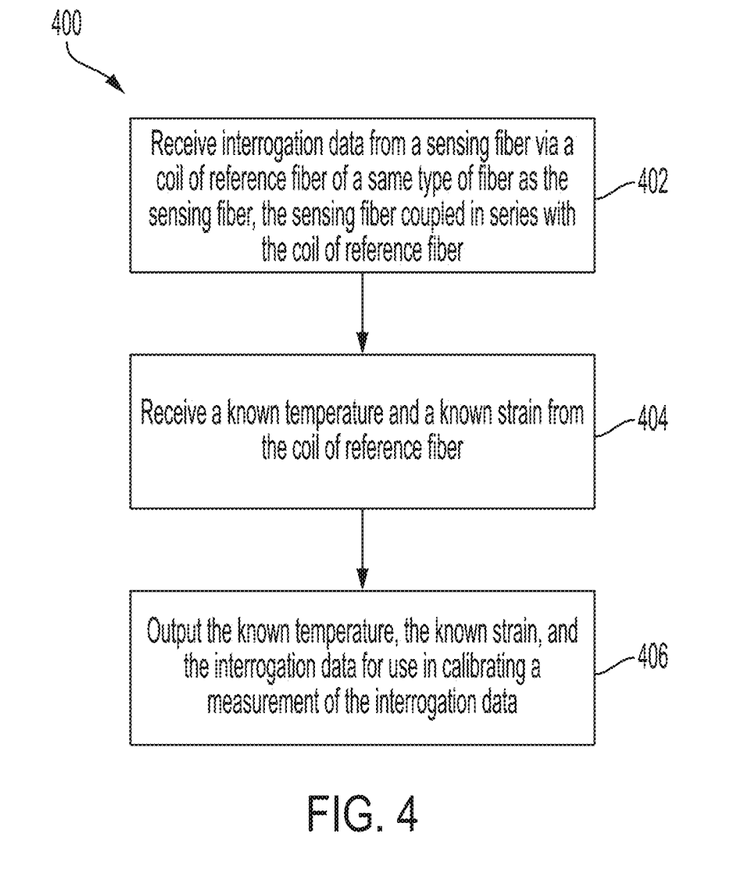
FIG. 4 is a flowchart of a process for outputting a known temperature, a known strain, and interrogation data according to one example of the present disclosure.

FIG. 4 is a flowchart of a process for outputting the known temperature, the known strain, and interrogation data according to one example of the present disclosure. At block 402, one or more IU(s) 134 can receive interrogation data from the sensing fiber 126 via a coil of reference fiber 130 of a substantially similar or the same fiber as the sensing fiber 126, or a fiber with known properties with respect to the calibration process. The IU(s) 134 can measure, record, and calibrate frequency measurements, through Rayleigh-scattering principles in the case of DAS or using Brillouin measures in the case of a Brillouin-based IU. In some examples, a Brillouin frequency measurement may be a measurement of Brillouin peak intensity. The Brillouin frequency measurement may allow temperature and strain separation to occur via the IU(s) 134 to produce measurements of temperature and strain. The IU(s) 134 can extract the measurements of temperature and strain, and any other suitable interrogation data from the interrogation data, which may then be stored in the IU(s) 134 or elsewhere. In some examples, a temperature profile may be available via the IU(s) 134 for observing the measured temperatures.

In some examples, processing functions of the IU(s) 134 may be standardized or customized functions. Data archiving capabilities of the IU(s) 134 may be performed. In some examples, data collection options of the IU(s) 134 may be defined and implemented according to triggered, timed, or any other suitable method for collecting interrogation data from the sensing fiber 126 via the coil of reference fiber 130. In an example, a signal may pass through the coil of reference fiber 130, and any backscattered light containing Brillouin shift wavelength information and intensity may then be amplified on the return leg where the gain of the Brillouin peak intensity may create an offset. The offset in the interrogation data may be a response to the measurement of temperature or strain at a certain temperature or pressure where the measurement is not affecting the signal when the Raman pump amplifier 210 amplifies the signal.

At block 404, the IU(s) 134 can receive a known temperature and a known strain from the coil of reference fiber 130. Brillouin-based IUs can receive known temperature and known static strain. And, DAS-based IU(s) can receive a known temperature and a dynamic strain, which may be known. The coil of reference fiber 130 may provide the known temperature and the known strain. In some examples, the known temperature of the coil of reference fiber can be provided via the one or more materials coupled to the coil of reference fiber 130 via the housing 132. In some examples, data (e.g., coefficient of expansion) about the materials (e.g., different metals) coupled to the coil of reference fiber 130 may be obtained. In an example, extracting the temperature and strain can be done using the thermal coefficients of expansion of the multiple materials. The thermal coefficients of expansion of the multiple materials can be used with multiple coils of reference fiber 130 to differentiate between temperature and strain. For example, the Brillouin-based IU can measure the Brillouin peak intensity shift of the material such that the difference in a peak wavelength may be a function of temperature and the measured intensity may be proportional to temperature. The known strain can be a function of the known temperature. For example, the strain can be based on an initial known strain (e.g., zero elastic axial strain) of the coil of reference fiber 130. In some examples, the heater 305 can be applied to the coil of reference fiber 130 to change the temperature of the coil of reference fiber 130 in a known way for generating calibration data. For example, the temperature increase can be used for different coils of reference fiber 130 where a different known amount may be used for each coil of reference fiber 130 to calibrate different wells. In some examples, the temperature sensor 204 may be used to obtain the temperature of the coil of reference fiber 130 for use in calibration of the sensing fiber 126. The calibration data may be recorded and stored by the IU(s) 134. In some examples, the coil of reference fiber 130 as a calibration reference for the DAS system, and may be used to determine the health of the DAS system over time, in a similar manner as described previously. Additionally or alternatively, the coil of reference fiber 130 can be used to control the gain in the DAS system, based on the DAS data received from the coil of reference fiber 130.

At block 406, the IU(s) 134 can output the known temperature, the known strain, and the interrogation data for use in calibrating a measurement (e.g., temperature, strain) of the interrogation data. The known temperature and the known strain can function to provide a reference measurement, which may be used to calibrate the measured temperature and strain within the wellbore as needed. The coil of reference fiber 130 and additional interrogation data may be used to generate additional calibration data. The additional interrogation data may include data about temperature and strain from the one or more materials coupled to the coil of reference fiber thereby providing calibration data. The calibration data may then be used for a calibration. In some examples, the output of known temperature, known strain, and the interrogation data can be used by a user of the system to perform a calibration.

The calibration can include calibrating the measurement of temperature and strain extracted from the interrogation data. For example, the user may observe the temperature profile of the DAS IU to calibrate an offset observed in the temperature measurement. The strain may then be calibrated as a function of the calibrated temperature. In some examples, the IU(s) 134 can automatically output a calibration of the measurement of temperature and strain. For example, the IU(s) 134 can automatically output a calibration by determining an offset of a measurement in the interrogation data, and in response to determining the offset, the IU(s) 134 may formulate a calibration command to carry out the calibration. Performing the calibration may include using generated calibration data from the coil of reference fiber 130 to determine calibrated measurements of temperature and strain. In some examples, the IU(s) 134 may then determine measured downhole parameters based on the calibrated measurements. In some examples, the calibrated measurements (e.g., temperature, strain) and any other suitable interrogation data can be used to determine other parameters that depend on temperature and strain for the wellbore operation. And, in some examples, the DAS system itself can be calibrated using the known temperature and strain information.

In some aspects, a system, apparatus, and method for determining accuracy of interrogation data using a coil of reference fiber providing a known temperature and a known strain are provided according to one or more of the following examples:

Example 1 is a system comprising: a sensing fiber positionable downhole in a wellbore; a coil of reference fiber of a same type of fiber as the sensing fiber and positionable to be coupled in series with the sensing fiber and at a location to provide a known temperature and a known strain usable for interpreting interrogation data from the sensing fiber.

Example 2 is the system of example(s) 1, wherein the known temperature and the known strain are usable for calibrating offsets in measurement signals in the interrogation data.

Example 3 is the system of example(s) 1, further comprising at least one circulator spliceable with the sensing fiber for steering backscattered light unidirectionally between one or more inputs and one or more outputs of the at least one circulator for a portion of the sensing fiber.

Example 4 is the system of example(s) 3, wherein the coil of reference fiber is configured to be coupled between the sensing fiber and the at least one circulator.

Example 5 is the system of example(s) 1, further comprising a Raman pump amplifier spliceable with a fiber in line with the circulator for selectively amplifying light propagating to the sensing fiber or for amplifying backscattered light originating from the sensing fiber and for providing gain of the interrogation data.

Example 6 is the system of example(s) 1, wherein the coil of reference fiber is coupleable to one or more materials with the known temperature, the one or more materials including known properties, and wherein the known strain is a function of temperature.

Example 7 is the system of example(s) 1, further comprising a heater for increasing the known temperature of the coil of reference fiber by a known amount for generating calibration data.

Example 8 is the system of example(s) 7, wherein a temperature of the heater is increased remotely for providing remote calibration of the sensing fiber.

Example 9 is an apparatus comprising: a housing having a first port for receiving part of a sensing fiber positionable in a wellbore and a second port for receiving an umbilical fiber; and a coil of reference fiber positionable in an inner area defined by the housing, the coil of reference fiber being a type of fiber that is a same type of fiber as the sensing fiber and being spliceable with the sensing fiber such that the coil of reference fiber is coupled in series with the sensing fiber to provide a known temperature and a known strain usable for interpreting interrogation data from the sensing fiber.

Example 10 is the apparatus of example(s) 9, wherein the known temperature and the known strain are usable for calibrating offsets in measurement signals in the interrogation data.

Example 11 is the apparatus of example(s) 9, wherein the coil of reference fiber is configured to be coupled to the umbilical fiber and between the sensing fiber and at least one circulator.

Example 12 is the apparatus of example(s) 9, wherein the coil of reference fiber is coupleable to one or more materials with the known temperature, the one or more materials including known properties, and wherein the known strain is a function of temperature.

Example 13 is the apparatus of example(s) 9, further comprising a heater disposable in an inner area defined by the housing for increasing the known temperature of the coil of reference fiber by a known amount for generating calibration data.

Example 14 is the apparatus of example(s) 13, wherein a temperature of the heater is increased remotely for causing the coil of reference fiber to generate calibration data remotely.

Example 15 is a method comprising: receiving interrogation data from a sensing fiber via a coil of reference fiber of a same type of fiber as the sensing fiber, the sensing fiber coupled in series with the coil of reference fiber; receiving a known temperature and a known strain from the coil of reference fiber; and outputting the known temperature, the known strain, and the interrogation data for use in calibrating a measurement of the interrogation data.

Example 16 is the method of example(s) 15, wherein outputting the known temperature, the known strain, and the interrogation data includes using an interrogator device to formulate a calibration command and output a calibration of the interrogation data.

Example 17 is the method of example(s) 15, wherein the sensing fiber is spliced with at least one circulator for steering backscattered light unidirectionally between one or more inputs and one or more outputs of the at least one circulator for a portion of the sensing fiber.

Example 18 is the method of example(s) 17, wherein the coil of reference fiber is coupled between the sensing fiber and the at least one circulator.

Example 19 is the method of example(s) 15, wherein a Raman pump amplifier is spliced with a fiber in line with the circulator that selectively amplifies light propagating to the sensing fiber or amplifies backscattered light originating from the sensing fiber, and provides gain of the interrogation data.

Example 20 is the method of example(s) 15, wherein the coil of reference fiber is coupled to one or more materials with the known temperature, the one or more materials including known properties, and wherein the known strain is a function of temperature.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   an interrogator unit operable to generate optical signals and receive interrogation data;
   a topside circulator couplable to the interrogator unit and spliceable with a downstream umbilical fiber, the topside circulator having an input operable to receive the interrogation data from an upstream umbilical fiber;
   a subsea circulator couplable to the downstream umbilical fiber, the subsea circulator operable to steer backscattered light associated with the interrogation data to the upstream umbilical fiber;
   a subsea tree portion positionable on a sea floor location above a wellbore, the subsea tree portion comprising:
   a coil of reference fiber positionable at the sea floor location to provide a known temperature and a known strain usable for interpreting the interrogation data, the coil of reference fiber having a first portion and a second portion defining a total length of the coil of reference fiber, wherein a dead zone effect is present in the first portion and the dead zone effect is not present in the total length; and
   a sensing fiber of a same type of fiber as the coil of reference fiber and positionable in series with the coil of reference fiber, the sensing fiber positionable to generate the interrogation data.

2. The system of claim 1, wherein the known temperature and the known strain are usable for calibrating offsets in measurement signals in the interrogation data.

3. The system of claim 1, wherein the coil of reference fiber is coupleable to one or more materials with the known temperature, the one or more materials including known properties, and wherein the known strain is a function of temperature.

4. The system of claim 1, further comprising a heater for increasing the known temperature of the coil of reference fiber by a known amount for generating calibration data.

5. The system of claim 4, wherein a temperature of the heater is increased remotely for providing remote calibration of the sensing fiber.

6. The system of claim 1, wherein the subsea circulator is spliceable with the coil of reference fiber for steering the backscattered light unidirectionally between one or more inputs and one or more outputs of the at least one circulator for a portion of the coil of reference fiber.

7. The system of claim 6, wherein the coil of reference fiber is configured to be coupled between the sensing fiber and the subsea circulator.

8. The system of claim 6, further comprising a Raman pump amplifier spliceable with one or more of the downstream umbilical fiber or the upstream umbilical fiber for selectively amplifying light propagating to the sensing fiber or for amplifying backscattered light originating from the sensing fiber and for providing gain of the interrogation data.

9. The system of claim 1, wherein the subsea tree portion further comprises:
   a housing having a first port for receiving part of the sensing fiber and a second port for receiving the downstream an umbilical fiber from the subsea circulator, wherein the coil of reference fiber is positionable in an inner area defined by the housing, and wherein an outer area of the housing is in contact with ocean water.

10. The system of claim 9, wherein the known temperature and the known strain are usable for calibrating offsets in measurement signals in the interrogation data.

11. The system of claim 9, wherein the coil of reference fiber is configured to be coupled to the downstream umbilical fiber from the subsea circulator and between the sensing fiber and the subsea circulator.

12. The system of claim 9, wherein the coil of reference fiber is coupleable to one or more materials with the known temperature, the one or more materials including known properties, and wherein the known strain is a function of temperature.

13. The system of claim 9, further comprising a heater disposable in the inner area defined by the housing for increasing the known temperature of the coil of reference fiber by a known amount for generating calibration data.

14. The system of claim 13, wherein a temperature of the heater is increased remotely for causing the coil of reference fiber to generate calibration data remotely.

* * * * *